United States Patent
Franzone, Jr. et al.

(10) Patent No.: US 10,377,175 B2
(45) Date of Patent: Aug. 13, 2019

(54) CASTER ADAPTER OR WHEEL ASSEMBLY FOR MOBILE WHEEL BASE

(71) Applicant: ALLEN FIELD COMPANY, INC., Brightwaters, NY (US)

(72) Inventors: Andrew Franzone, Jr., Bay Shore, NY (US); Robert Ahearn, Massapequa, NY (US); Eric Seger, Wantagh, NY (US)

(73) Assignee: ALLEN FIELD COMPANY, INC., Brightwaters, NY (US)

( * ) Notice: Subject to any disclaimer, the term of this patent is extended or adjusted under 35 U.S.C. 154(b) by 28 days.

(21) Appl. No.: 15/808,973

(22) Filed: Nov. 10, 2017

(65) Prior Publication Data
US 2018/0134074 A1   May 17, 2018

Related U.S. Application Data

(60) Provisional application No. 62/421,668, filed on Nov. 14, 2016.

(51) Int. Cl.
*B60B 33/00* (2006.01)
*B65D 25/24* (2006.01)

(52) U.S. Cl.
CPC .......... *B60B 33/0002* (2013.01); *B65D 25/24* (2013.01)

(58) Field of Classification Search
CPC ....... B60B 29/002; B60B 30/10; B60B 33/00; B60B 33/001; B60B 33/0018; B60B 33/0002; B60B 33/0023; B60B 33/0026; B60B 33/04; B60B 33/0042; B60B 33/0044; B62B 230/08; B62B 230/10; B62B 2202/02; B62B 2202/10; B62B 2202/12; B62B 2206/02; B62B 5/0083; B62B 5/0086; B62B 3/02; B62B 3/002; B62B 1/12; B62B 1/16; B62B 1/264; A47B 91/06; A47B 91/12; A47B 91/16; Y10T 16/19; Y10T 16/191; Y10T 16/203

See application file for complete search history.

(56) References Cited

U.S. PATENT DOCUMENTS 114,061 A     4/1871  Stevens
1,781,732 A * 11/1930 Noelting ............. B60B 33/0002
                                                    16/39

(Continued)

FOREIGN PATENT DOCUMENTS

CN       201228151 Y      4/2009
CN       204563352 U      8/2015

*Primary Examiner* — Chuck Y Mah
(74) *Attorney, Agent, or Firm* — Epstein Drangel LLP; Robert L. Epstein (57) ABSTRACT

In order to form a mobile wheel base, a stem caster adapter or a wheel assembly are attached to the bottom of a platform support or a container such as a cardboard carton are provided. The adapter has a body with a cylindrical recess open at the bottom surface adapted to receive and engage the stem of the caster. In the wheel assembly, a wheel or roller is rotatably attached to the bottom of the body. Both the adapter and wheel assembly have a cylindrical member extending from the top surface of the body with oppositely extending protrusions forming a bayonet-type mount. The mount is received within an opening in the bottom of the platform support or container and then rotated to attach the adapter or wheel assembly to the platform support or container.

19 Claims, 9 Drawing Sheets

(56) References Cited

U.S. PATENT DOCUMENTS

| | | | | |
|---|---|---|---|---|
| 3,128,495 A | * | 4/1964 | Tooth | B60B 33/0002 16/38 |
| 4,026,570 A | * | 5/1977 | Feinberg | A45C 5/143 16/30 |
| 4,068,342 A | * | 1/1978 | Carrier | B60B 33/0002 16/21 |
| 4,350,355 A | * | 9/1982 | Hannan | B60B 33/0002 16/30 |
| 5,062,178 A | * | 11/1991 | Chiu | B60B 33/0002 16/30 |
| 5,737,801 A | * | 4/1998 | Flood | B60B 33/0002 16/30 |
| 5,934,639 A | | 8/1999 | Chiang et al. | |
| 7,600,294 B2 | * | 10/2009 | Hartman | B60B 33/0002 16/29 |
| 7,657,969 B2 | | 2/2010 | Ruggero | |
| 8,657,309 B2 | * | 2/2014 | Taylor | B60B 33/0007 280/47.32 |
| 2006/0032412 A1 | * | 2/2006 | Harner | B65D 19/06 108/55.1 |
| 2008/0224521 A1 | | 9/2008 | Topping | |
| 2012/0286486 A1 | | 11/2012 | Varney et al. | |

* cited by examiner

CASTER ADAPTER OR WHEEL ASSEMBLY FOR MOBILE WHEEL BASE

CROSS-REFERENCE TO RELATED APPLICATIONS

Priority is claimed on Provisional Patent Application Ser. No. 62/421,668, filed Nov. 14, 2016, the entirety of which is incorporated herein by reference.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to a mobile wheel base and more particularly to a caster adapter or a wheel assembly for mounting a caster or wheel to the bottom of a platform or container such as a cardboard carton.

2. Description of Prior Art Including Information Disclosed Under 37 CFR 1.97 and 1.98

Containers such as cardboard cartons are used frequently to store and ship many types of products. During storage and shipping, the products must be warehoused and transported from one location to another. Because the filled containers are often quite heavy, it may be difficult for personnel to simply pick the containers up and carry them from place to place. It is therefore necessary to place the containers on a trolley with wheels or, for larger loads, on a pallet for movement by a forklift.

However, trolleys and pallets are costly and require storage when not in use. Further, they need periodic maintenance and repair. They wear out and need replacement.

There is therefore a need for a simple, inexpensive means of converting a platform which functions as a container support or a container in the form of carton with a cardboard bottom into a mobile wheel base which can be used instead of a trolley or pallet to manually move containers and cartons from one location to another.

BRIEF SUMMARY OF THE INVENTION

It is a prime object of the present invention to provide a means for eliminating the need for a trolley, pallet or other instrumentality to manually move containers such as cardboard cartons from one location to another.

It is another object of the present invention to provide a simple, inexpensive means for moving containers such as cardboard cartons.

It is another object of the present invention to provide an adapter for mounting a caster to the bottom of a platform or container such as a cardboard carton.

It is another object of the present invention to provide an assembly for mounting an integral wheel or roller to the bottom of a platform or container such as a cardboard carton.

In accordance with the present invention, an adapter is provided for use in attaching a stem caster to the bottom of a platform or container such as a cardboard carton to form a mobile wheel base. The platform or container bottom has an opening. The adapter includes a body having a top surface and a bottom surface. A substantially cylindrical recess within the body open at the bottom surface of the body is adapted to receive and engage the stem of the caster. A substantially cylindrical member extending from the top surface of the body is adapted to be received within the platform or container opening so as to attach the caster to the platform or container.

The adapter further includes a protrusion extending outwardly from the member. Preferably, the adapter includes first and second protrusions extending from the member in substantially opposite directions such that the member forms a bayonet-type mount.

Preferably, the protrusion includes a section inclined away from the body to facilitate connecting the adapter to the bottom of the platform or container.

Preferably, the stem receiving recess is aligned with and extends into the member.

In accordance with another aspect of the present invention, a combination of a conventional stem caster, a platform or container, and an adapter for use in attaching the stem caster to the bottom of the platform or container are provided to form a mobile wheel base. The bottom of the platform or container includes an opening. The adapter includes a body having a top surface and a bottom surface. A substantially cylindrical recess within the body open at the bottom surface of the body is adapted to receive and engage the stem of the caster. A substantially cylindrical member extends from the top surface of the body. The member is adapted to be received within the platform or container opening so as to connect the adapter to the platform or container.

First and second protrusions extend from the member in substantially opposite directions such that the member takes the form of a bayonet-type mount. Preferably, at least one of the protrusions includes a section inclined away from the body.

Preferably, the recess is aligned with and extends into the member.

In accordance with another aspect of the present invention, a wheel assembly for a platform or container is provided. The platform or container has a bottom with an opening. The assembly includes a body having a top surface and a bottom surface. The body includes first and second spaced brackets extending from the bottom surface of the body. A wheel or roller is rotatably mounted between the brackets. A substantially cylindrical member extends from the top surface of the body. The member is adapted to be received within the platform or container opening so as to connect the wheel assembly to the platform or container.

A protrusion extends outwardly from the member. Preferably, the assembly includes first and second protrusions extending from the member in substantially opposite directions so as to form a bayonet-type mount.

Preferably, at least one of the protrusions includes a section inclined away from the body.

In accordance with another aspect of the present invention, a combination is provided including a wheel or roller, a platform or container having a bottom, and an assembly for attaching the wheel or roller to the bottom of the platform or container to form a mobile wheel base. The platform or container bottom has an opening. The assembly includes a body having a top surface and a bottom surface. First and second spaced brackets extend from the bottom surface of the body. The wheel or roller is rotatably mounted between the brackets. A substantially cylindrical member extends from the top surface of the body. The member is adapted to be received within the platform or container opening so as to engage the platform or container.

The combination further includes a protrusion extending outwardly from the member. Preferably, first and second protrusions extend from the member in substantially opposite directions such that the member takes the form of a bayonet-type mount.

Preferably, at least one of the protrusions includes a section inclined away from the body.

BRIEF DESCRIPTION OF THE SEVERAL VIEWS OF DRAWINGS

To these and to such other objects that may hereinafter appear, the present invention relates to a caster adapter or wheel assembly for a mobile wheel base as described in detail in the following specification and recited in the annexed claims, taken together with the accompanying drawings, in which like numerals refer to like parts and in which:

DETAILED DESCRIPTION OF THE INVENTION

Figure 1:
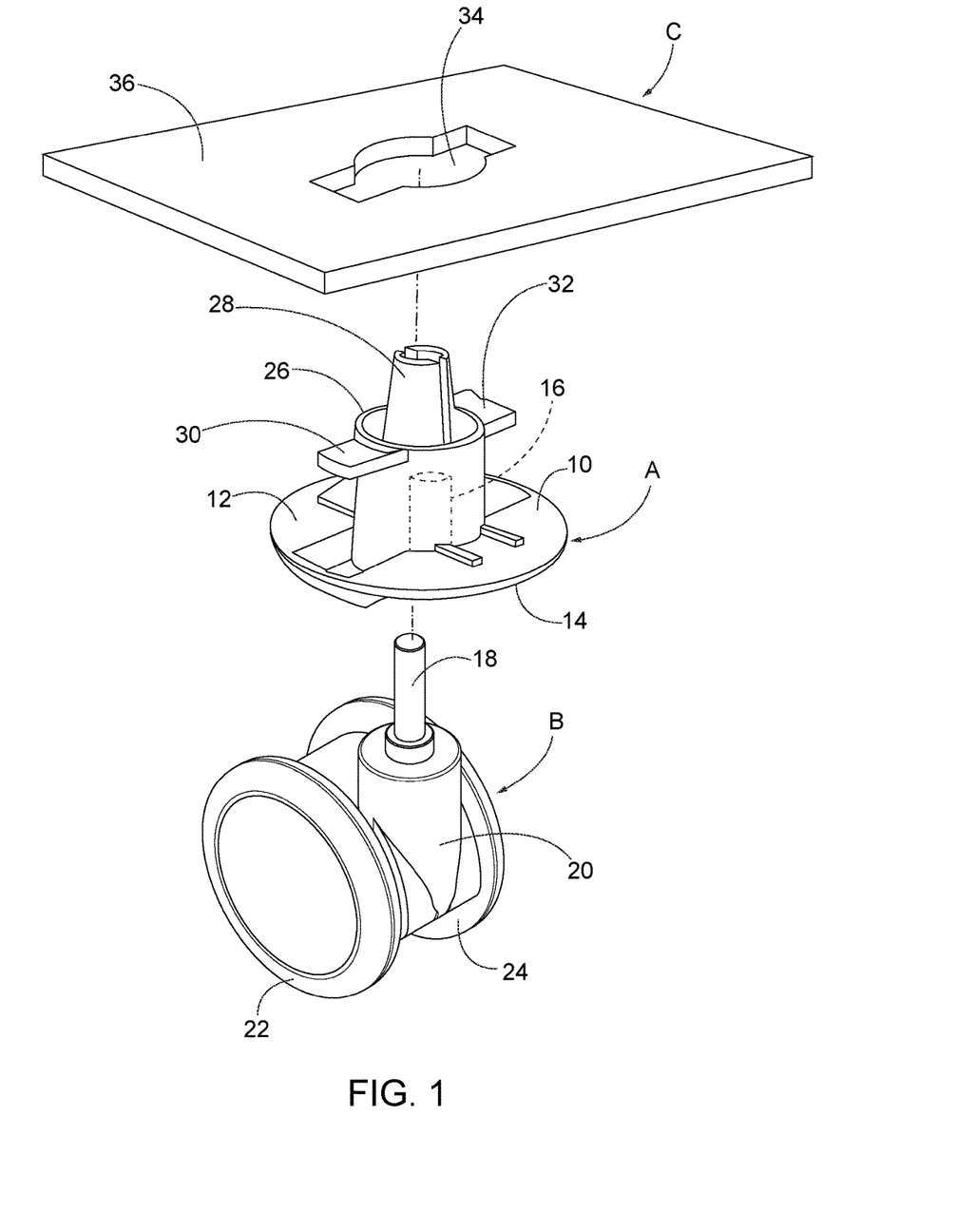
FIG. 1 is an exploded perspective view of a first preferred embodiment of a caster adapter of the present invention, a conventional caster and a section of the bottom of a platform or container to which the caster adapter can attach the caster.

FIG. 1 illustrates a first preferred embodiment of the caster adapter, generally designated A. Adapter A is designed to attach a conventional stem caster, generally designated B, to the bottom of a platform for supporting a container or to a container itself, generally designated C. Platform or container C can be made of cardboard, plastic, wood or any other suitable material.

FIG. 1 shows only portion of the bottom of platform or container C and a single adapter A for purposes of illustration. However, it should be understood that multiple adapters would normally be used in conjunction with a platform or container. The number and locations of the adapters would depend upon the size and weight of the container to be supported by the platform or of the container, if the adapter is attached to the container itself. Typically, at least four adapters would be used, each adapter being situated proximate a different corner of the platform or container.

Adapter A includes a circular body 10 having a top surface 12 and a bottom surface 14. Bottom surface 14 has a central opening which constitutes an entrance to a cylindrically shaped recess 16 adapted to receive and engage the stem 18 of caster B.

Stem 18 of caster B is rotatably connected to the body 20 of the caster such that the caster can freely swivel relative to the adapter. Rotatably attached to opposite sides of caster body 20 are parallel wheels 22, 24 which allow the caster to move along a surface such as the floor or ground.

Protruding from the top surface 12 of adapter body 10 is a generally cylindrical member 26 which constitutes a bayonet-type mount for attaching adapter A to the bottom of a platform support or container C. Member 26 includes a central portion 28 and first and second oppositely extending protrusions 30, 32.

An opening 34 of the shape depicted in FIG. 1 is created in platform or container C. In order to attach adapter A to the bottom of the platform support or container C, member 26 is inserted through opening 34 and the adapter is rotated relative to platform or container C such that protrusions 30, 32 are situated over the top surface 36 of platform support or container C so as to secure the adapter to the bottom of the platform or container.

FIGS. 2-10 illustrate a second preferred embodiment of the adapter of the present invention, generally designated D. Adapter D has a generally square shaped body 40 with a top surface 42 and a bottom surface 44. A part 45 extends from the bottom surface 44 of body 40. Part 45 has an opening to an internal recess 16 adapted to receive and engage stem 18 of caster B.

Protruding from the top surface 42 of body 40 is a generally cylindrical member 46 with oppositely extending protrusions 48, 50 which forms a bayonet-type mount. As with adapter A, member 46 is adapted to be received in opening 34 of platform or container C and rotated relative to platform or container to attach adapter D to platform or container C.

Figure 2:
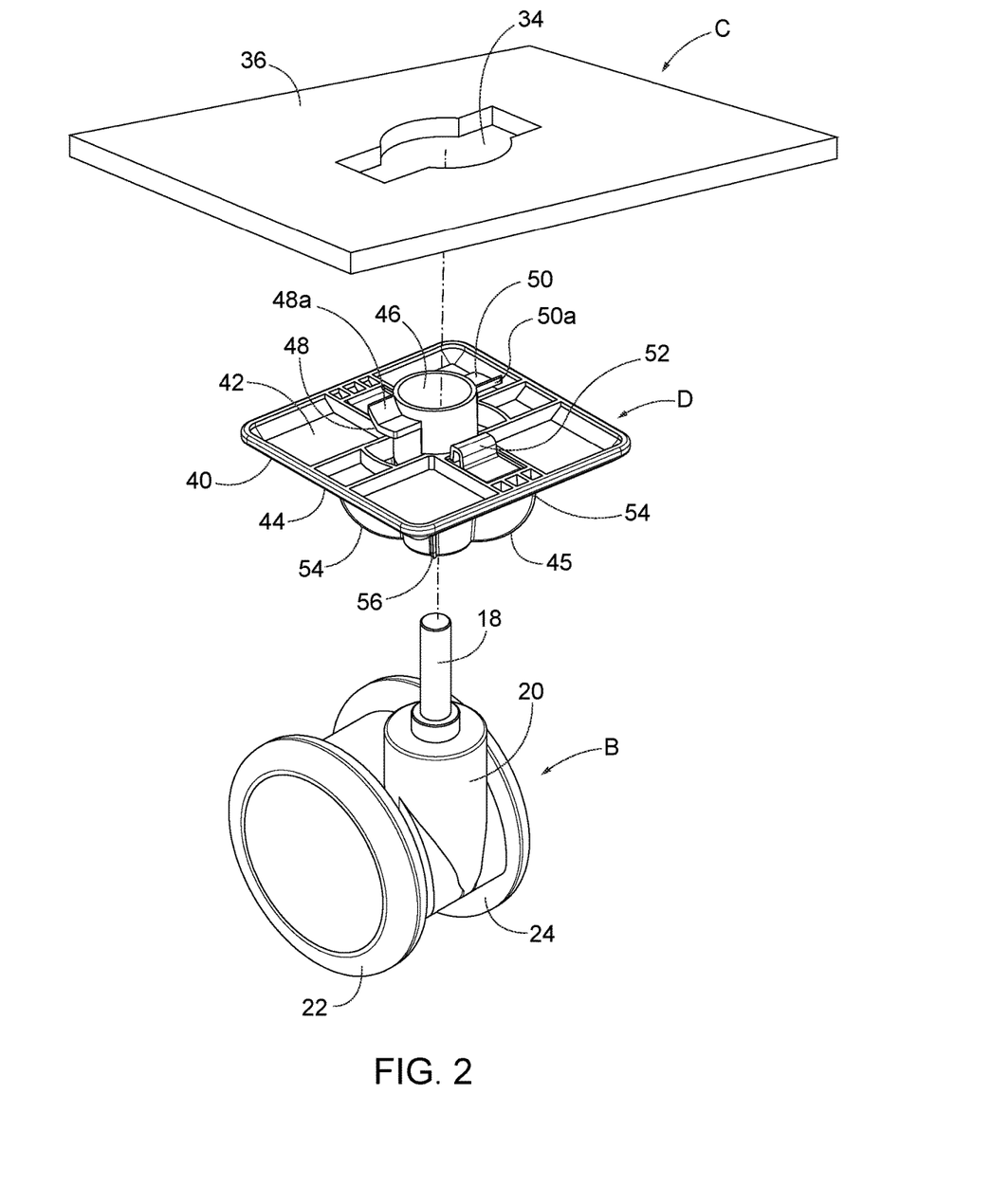
FIG. 2 is an exploded perspective view of a second preferred embodiment of a caster adapter of the present invention, a conventional caster and a section of the bottom of a platform or container to which the caster adapter can attach the caster.
Figure 3:
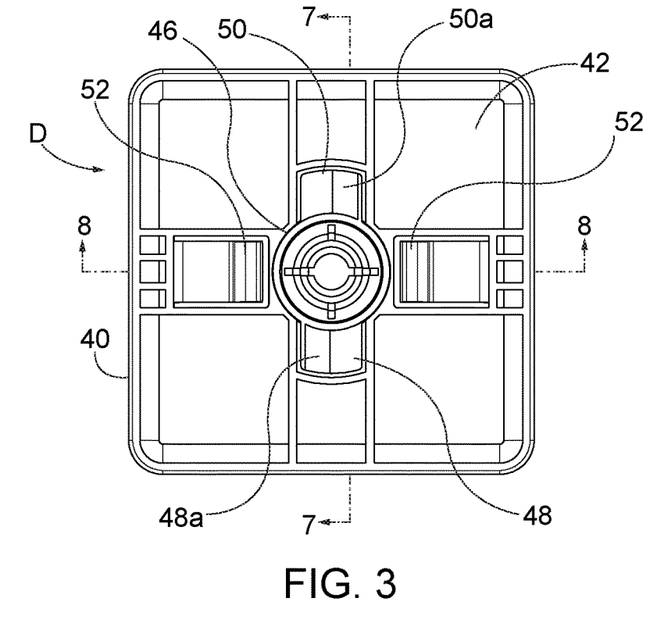
FIG. 3 is a plan view of the top of the second preferred embodiment of the adapter of the present invention.
Figure 4:
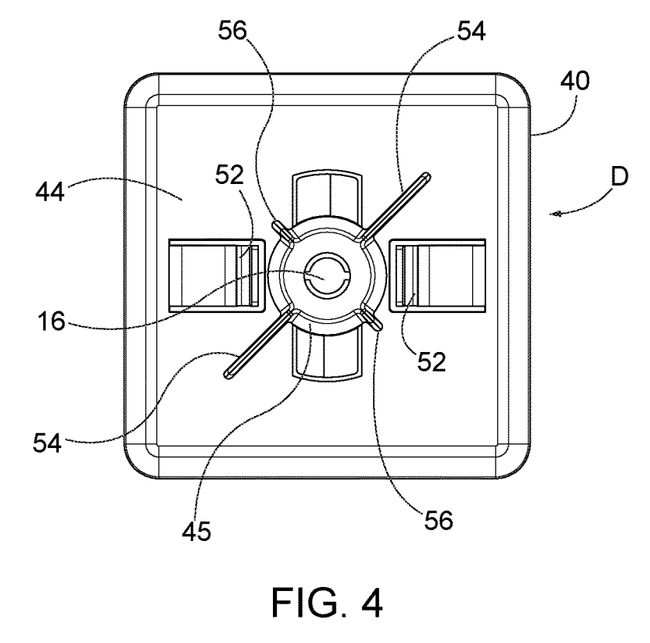
FIG. 4 is a plan view of the bottom of the second preferred embodiment of the adapter of the present invention.
Figure 5:
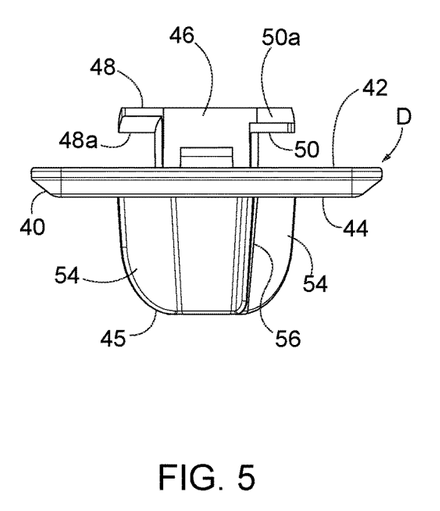
FIG. 5 is an elevation view of the front of the second preferred embodiment of the adapter of the present invention.
Figure 6:
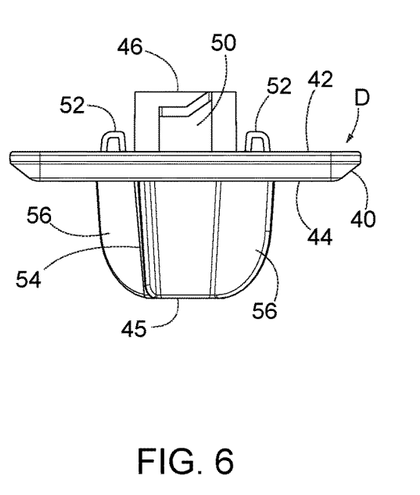
FIG. 6 is an elevation view of the side of the second preferred embodiment of the adapter of the present invention.
Figure 7:
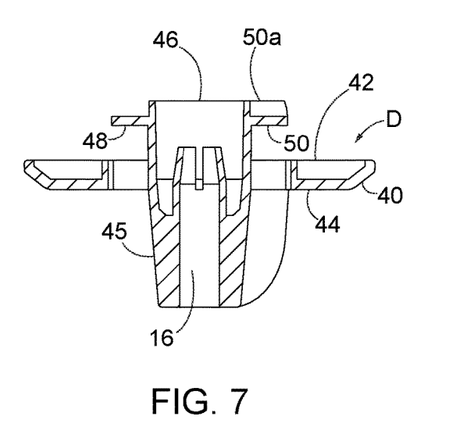
FIG. 7 is a cross-sectional view of second preferred embodiment of the adapter of the present invention taken along line 7-7 of FIG. 3.
Figure 8:
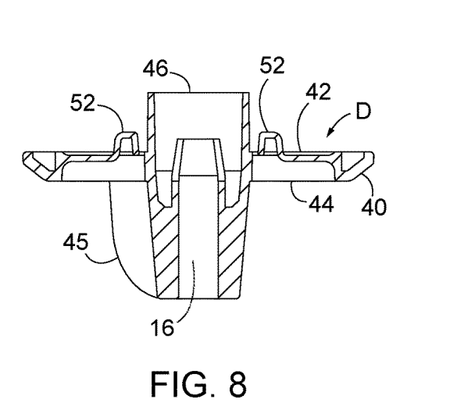
FIG. 8 is a cross-sectional view of second preferred embodiment of the adapter of the present invention taken along line 8-8 of FIG. 3.

FIG. 2 shows only a section of platform or container C and only a single adapter D. In practice, multiple casters would be attached to the bottom of platform or container C in spaced relation. Preferably, at least four casters, one situated proximate each corner of a four corner platform or container bottom, would be employed.

Protrusions 48 and 50 of adapter D each have a section 48a, 50a which is inclined away from top surface 42 of body 40. Sections 48a and 50a function to guide the edges of platform or container C which define opening 34 to slide under protrusions 48, 50 as adapter D is rotated relative to platform or container C.

In this embodiment, the top surface 42 of body 40 is provided with elongated members 52 situated on opposite sides of member 46 which protrude above the top surface 42 of body 40. Members 52 are approximately a wide as the narrow portions of opening 34. Once member 46 of adapter D is inserted into opening 34 and rotated relative to the platform or container C, members 52 will lodge within the narrow portions of opening 34 to prevent further rotation of the adapter relative to the platform or container.

Figure 9:
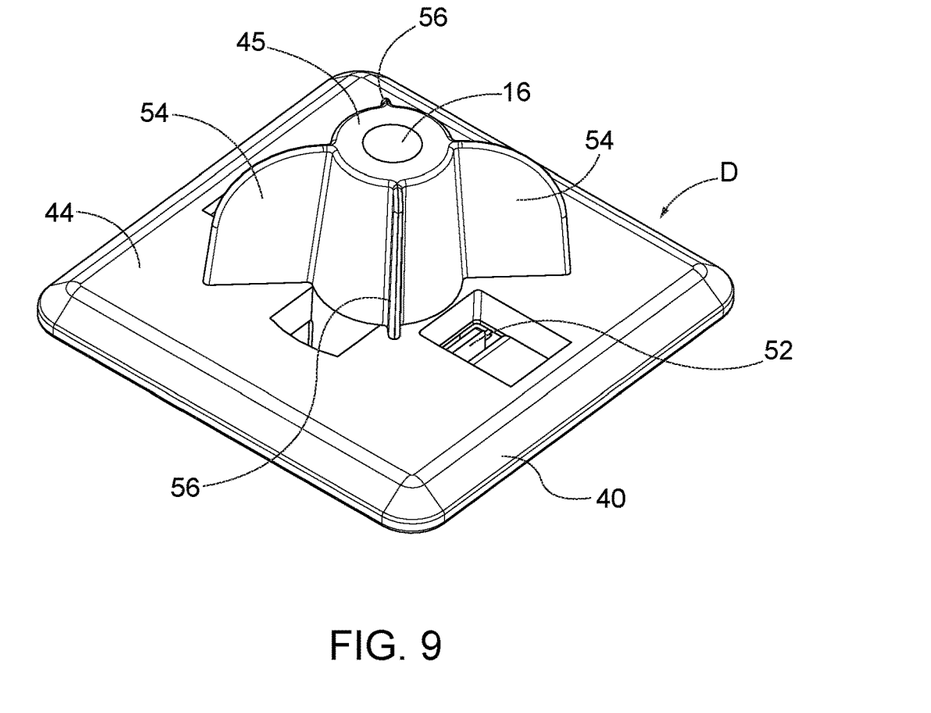
FIG. 9 is a perspective view of the bottom of the second preferred embodiment of the adapter of the present invention.
Figure 10:
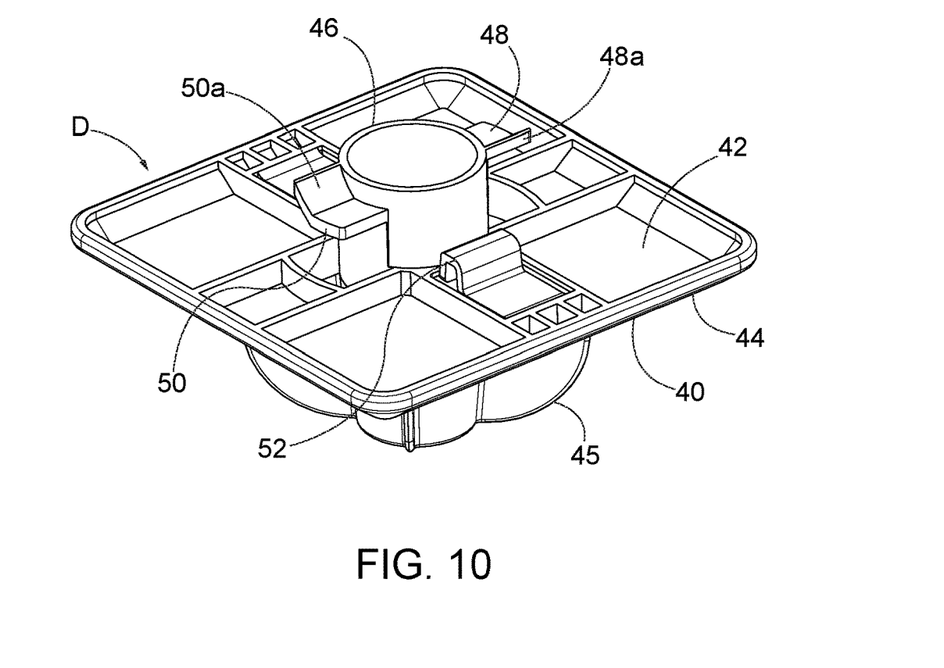
FIG. 10 is a perspective view of top of the second preferred embodiment of the adapter of the present invention.

As is best seen in FIG. 9, part 45 which protrudes from the bottom surface 44 of body 40 has two sets of oppositely directed fins 54, 56. Fins 54 are longer that fins 56. The fins provide extra strength to part 45 such that the weight of the platform or container is less likely to cause stem 18 of the caster to break the adapter.

FIGS. 11-18 illustrate a preferred embodiment of the wheel assembly of the present invention. As seen in the drawings, the wheel assembly, generally designated E, includes a body 58 with a top surface 60 and a bottom surface 62.

Figure 11:
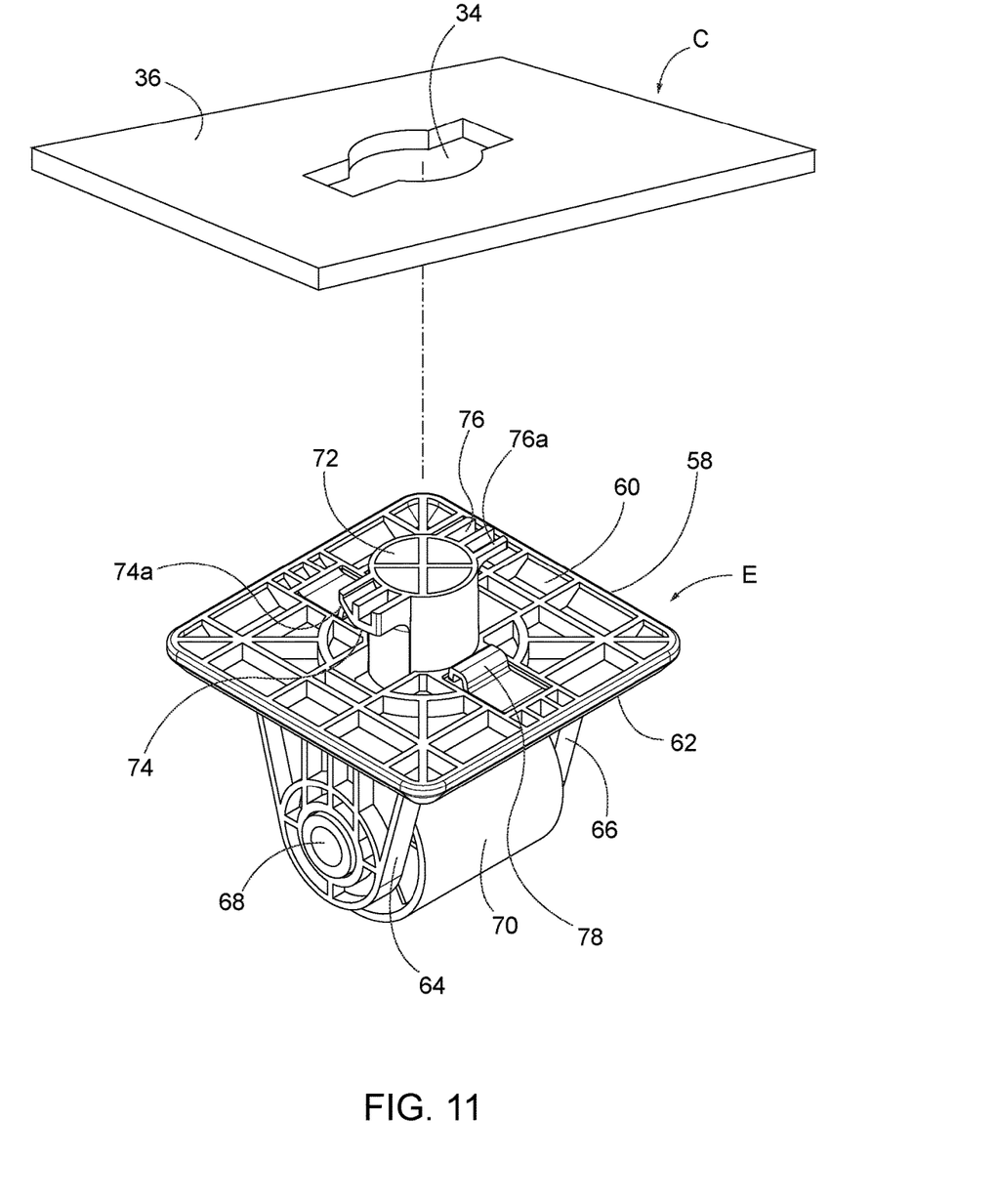
FIG. 11 is a an exploded view of a preferred embodiment of the wheel assembly of the present invention and a section of the bottom of a platform or container to which the wheel assembly can connect.
Figure 12:
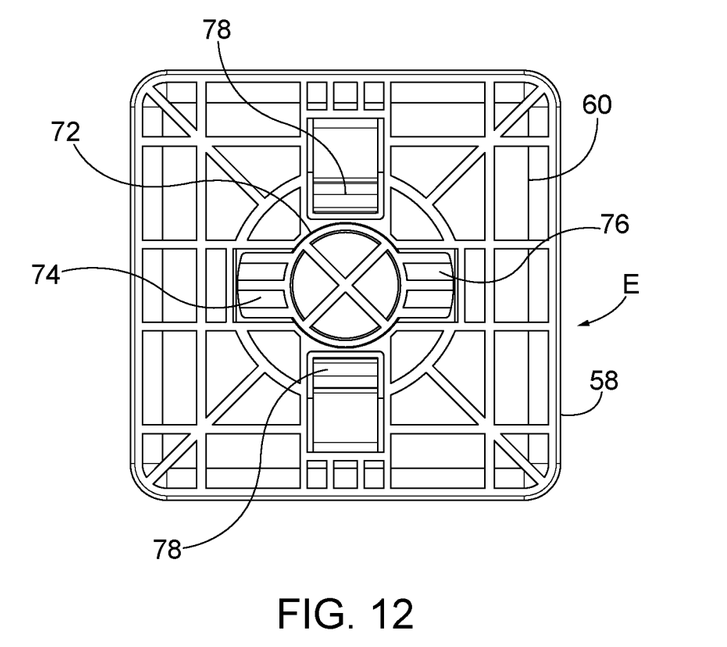
FIG. 12 is a plan view of the top of the preferred embodiment of the wheel assembly of the present invention.
Figure 13:
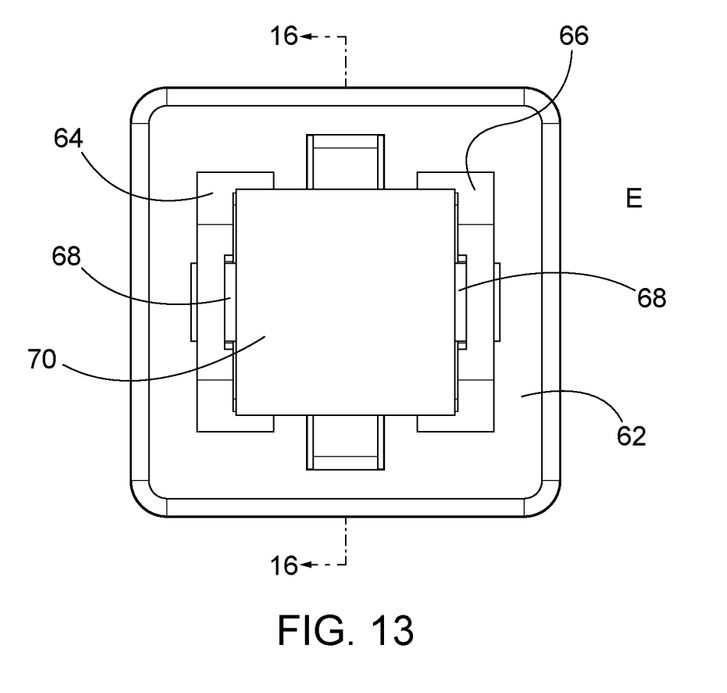
FIG. 13 is a plan view of the bottom of the preferred embodiment of the wheel assembly of the present invention.
Figure 14:
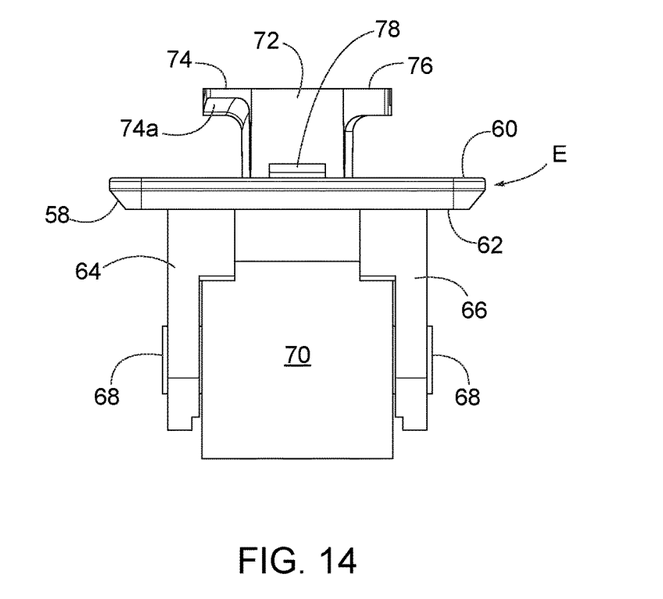
FIG. 14 is an elevation view of the front of the preferred embodiment of the wheel assembly of the present invention.
Figure 15:
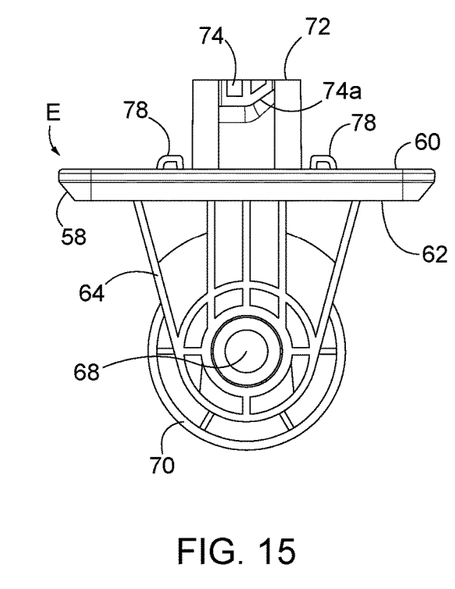
FIG. 15 is an elevation view of the side of the preferred embodiment of the wheel assembly of the present invention.
Figure 16:
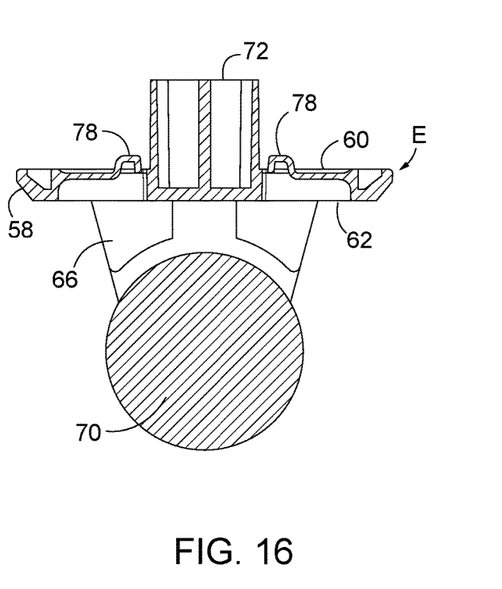
FIG. 16 is a cross-sectional view of the preferred embodiment of the wheel assembly of the present invention taken along line 16-16 of FIG. 13.
Figure 17:
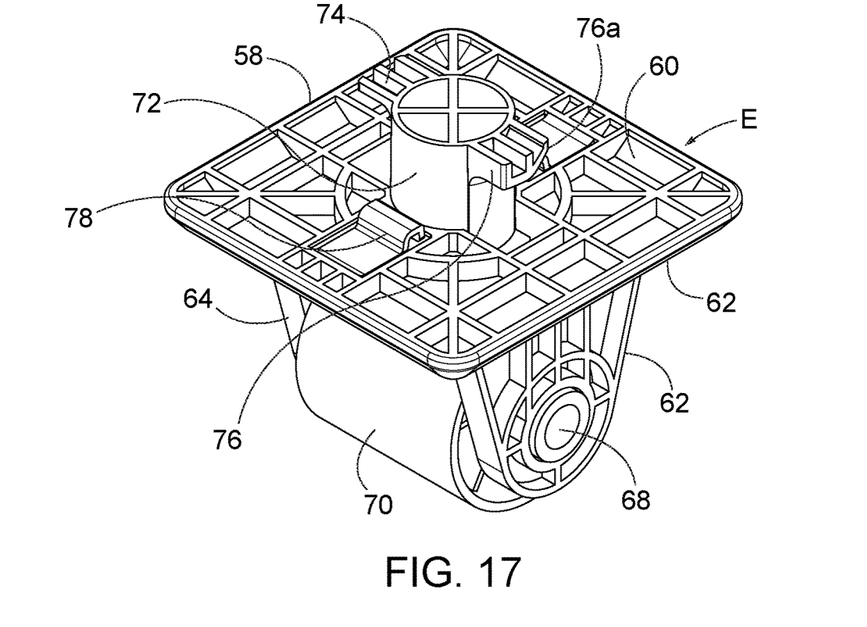
FIG. 17 is a perspective view of the bottom of the preferred embodiment of the wheel assembly of the present invention.
Figure 18:
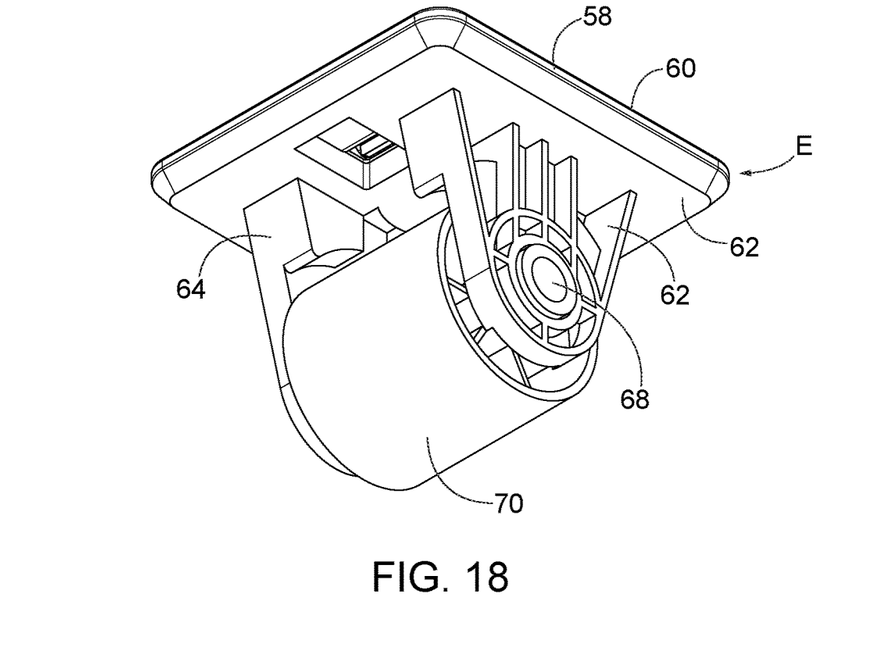
FIG. 18 is a perspective view of the top of the preferred embodiment of the wheel assembly of the present invention.

FIG. 11 shows the wheel assembly E and a portion of the platform or container C to which the wheel assembly will be attached. As will adapters A and D, several wheel assemblies would be used with a platform of container. Preferably, at least four wheel assemblies, would be employed, each located proximate to a different one of the corners of the platform or container bottom.

Extending downwardly from the bottom surface 62 of body 58 are a pair of spaced brackets 64, 66. Each bracket 64, 66 has a circular central opening adapted to receive one end of an axle 68 of a wheel or roller 70. Wheel or roller 70 is therefore free to rotate relative to the body 58.

The top surface 60 of body 58 has a cylindrical member 72 similar in function to member 46 of the second preferred embodiment of the caster adapter. Member 72 has oppositely extending protrusions 74, 76 similar in function to protrusions 48, 50 of the second preferred embodiment of the caster adapter. Member 72 and protrusions 74, 76 together form a bayonet-type mount for attaching the wheel assembly to platform or container C. Like the mount of the second preferred embodiment of the caster adapter, member 72 and protrusions 74, 76 are inserted into opening 34 of the platform or container and then rotated to attach the wheel assembly to the bottom of the platform or container.

Protrusions 74, 76 also have inclined sections 74a, 76a which, like protrusion sections 48a, 50a of the second preferred embodiment of the caster adapter, function to guide the edges of platform or container C which define opening 34 under the protrusions as the wheel assembly is rotated relative to the platform or container.

Like the second preferred embodiment of the caster adapter, wheel assembly E also has upstanding members 78 which are adapted to lodge in the narrow portions of opening 34 such that when the wheel assembly is fully seated in the opening of the bottom of the platform or container, the wheel assembly cannot rotate relative to the platform or container.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims:

We claim:

1. An adapter for use in attaching a stem caster to the bottom of a platform or container of the type having an opening of a given size and shape therein to form a mobile wheel base, said adapter comprising a body having a top surface and a bottom surface, a substantially cylindrical recess within said body open at said bottom surface, said recess being adapted to receive and engage the stem of the caster, and a substantially cylindrical member extending from said top surface of said adapter body and comprising a side wall and first and second protrusions radially extending from said side wall in opposite directions, such that said member and protrusions are the size and shape of the platform or container opening and adapted to be received within the platform or container opening, so as engage the bottom of the platform or container.

2. The adaptor of claim 1 wherein said member comprises a bayonet-type mount.

3. The adapter of claim 1 wherein said recess extends into said member.

4. The adapter of claim 1 wherein at least one of said protrusion comprises a section inclined away from said top surface of said body.

5. In combination, a stem caster, a platform or container having a bottom with an opening of a given size and shape, and an adapter for use in attaching said stem caster to the bottom of said platform or container to form a mobile wheel base, said adapter comprising a body having a top surface and a bottom surface, a substantially cylindrical recess within said body open at said bottom surface, said recess being adapted to receive and engage the stem of said caster, and a cylindrical member extending from said top surface of said body and comprising a side wall and first and second protrusions radially extending from said side wall in opposite directions, such that said member and protrusions are the size and shape of the platform or container opening and adapted to be received within said platform or container opening and turned relative to said platform or container so as engage the bottom of said platform or container.

6. The combination of claim 5 wherein said first and second protrusions extending from said member is substantially opposite directions.

7. The combination of claim 5 wherein said member takes the form of a bayonet-type mount.

8. The combination of claim 5 wherein said recess extends into said member.

9. The combination of claim 6 wherein at least one of said protrusions comprises a section inclined away from said top surface of said body.

10. A wheel assembly for a platform or container having a bottom with an opening of a given size and shape, said assembly comprising a body having a top surface and a bottom surface, said body comprising first and second spaced brackets extending from said bottom surface of said body, a wheel or roller rotatably mounted between said brackets, and a cylindrical member extending from said top surface of said body, said member comprising a side wall and first and second protrusions radially extending from said side wall in opposite directions, said member and protrusions being the size and shape of the platform or container opening and adapted to be received within the platform or container opening so as engage the bottom of the platform or container.

11. The assembly of claim 10 wherein said protrusions extending outwardly from said member.

12. The assembly of claim 10 further comprising first and second protrusions extending from said member is substantially opposite directions.

13. The assembly of claim 12 wherein at least one of said protrusions comprises a section inclined away from said body.

14. The assembly of claim 10 wherein said member takes the form of a bayonet-type mount.

15. In combination, a wheel or roller, a platform or container having a bottom with an opening of a given size and shape, and an assembly for attaching said wheel or roller to said bottom of the platform or container to form a mobile wheel base, said assembly comprising a body having a top surface and a bottom surface, first and second spaced brackets extending from said bottom surface of said body, said wheel or roller being rotatably mounted between said brackets, and a cylindrical member extending from said top surface of said body, said member comprising side wall and first and second protrusions radially extending from said side wall in op site directions, said member and protrusions being the size and shape of the platform or container opening and adapted to be received in said platform or container opening and turned relative to said platform or container so as engage said bottom of said platform or container.

16. The combination of claim 15 further comprising a protrusion extending outwardly from said member.

17. The combination of claim 15 further comprising first and second protrusions extending from said member is substantially opposite directions.

18. The combination of claim 15 wherein said member takes the form of a bayonet-type mount.

19. The combination of claim 17 wherein at least one of said protrusions comprises a section inclined away from said top surface of said body.

* * * * *